United States Patent [19]
Schwanz

[11] 3,947,056
[45] Mar. 30, 1976

[54] IMPACT-ELEMENT FOR THE PROTECTION OF THE OCCUPANT OF A VEHICLE

[75] Inventor: Wilfried Schwanz, Braunschweig, Germany

[73] Assignee: Volkswagenwerk AG., Wolfsburg, Germany

[22] Filed: Mar. 7, 1974

[21] Appl. No.: 448,926

[30] Foreign Application Priority Data

Mar. 12, 1973 Germany.......................... 2312202

[52] U.S. Cl............................. 280/150 B; 180/90
[51] Int. Cl.².......................................... B60R 21/04
[58] Field of Search .... 280/150 B, 150 AB; 180/90; 293/98

[56] References Cited
UNITED STATES PATENTS

| | | | |
|---|---|---|---|
| 3,806,154 | 4/1974 | Aklyama.......................... | 280/150 B |
| 3,827,740 | 8/1974 | Golze et al........................... | 293/98 |
| 3,831,972 | 8/1974 | Allgaier et al................ | 280/150 AB |
| 3,856,103 | 12/1974 | Scholz et al. ........................ | 180/90 |

FOREIGN PATENTS OR APPLICATIONS

| | | | |
|---|---|---|---|
| 1,923,305 | 10/1970 | Germany......................... | 280/150 B |

Primary Examiner—M. H. Wood, Jr.
Assistant Examiner—Michael J. Forman
Attorney, Agent, or Firm—Ernest F. Marmorek

[57] ABSTRACT

The impact-element of this invention includes an energy-absorbing, elongated deformation member which is secured to an elongated, dimensionally stable carrier that is, in turn, mounted below the dashboard of the vehicle. The energy-absorbing deformation forces are generally independent of the impact direction. In one embodiment of the invention, the energy-absorbing deformation member is an elongated, hollow body which, in transverse cross section, is ring-shaped at least in the portion opposing the knees of the occupants of the vehicle. In an alternative embodiment of the invention, the elongated, energy-absorbing member is hollow and is box-shaped in transverse cross section. In the second embodiment of the invention, a dimensionally stable, elongated cross piece is diagonally positioned within the box-shaped energy-absorbing member and contacts the upper end of the carrier. Stiffening means in the form of corrugations may be provided in both the box-shaped, energy-absorbing member and the cross piece of the second embodiment.

11 Claims, 3 Drawing Figures

IMPACT-ELEMENT FOR THE PROTECTION OF THE OCCUPANT OF A VEHICLE

BACKGROUND OF THE INVENTION

1. Field of the Invention

This invention relates generally to automotive safety devices and more particularly to an impact element for the protection of the occupants of a vehicle, especially of a motor vehicle.

2. Description of the Prior Art

Impact-elements for the protection of the passengers in a motor vehicle are well known in the prior art and take many different forms. For example, in German Pat. Nos. 1,172,559 and 1,227,359, impact-elements are described as protective, hollow rubber paddings that are mounted onto projecting portions of a vehicle by means of screws. The prior art paddings protect the occupants in the case of light impact. However, the prior art devices described in the aforementioned German patents are not particularly well suited for preventing injuries when somewhat greater impacts are involved since the paddings are frequently too resilient and are too soft for this purpose.

For the protection of the occupants in motor vehicles, it is known from German Pat. No. 1,214,558 to mount covering panels against selected interior surfaces of the vehicle, namely above the dashboard of the motor vehicle. Energy-absorbing deformation members are frequently used for this purpose. The energy-absorbing deformation members of the prior art either extend over the entire width of the dashboard or they are constructed in the form of short cross pieces which are distributed over the width of the dashboard. The energy-absorbing deformation members of the prior art may be semicircular, shell-shaped, stepped or undular in cross section and are proportioned in such a manner that they become permanently deformed and, in given cases, may even be destroyed when the head of the passenger impacts against the covering panel.

SUMMARY OF THE INVENTION

It is the purpose of the present invention to create an impact-element which is suited, in particular, for supporting the knees of the occupants of a motor vehicle in the event of a frontal accident. In accordance with the present invention, the purpose and object are achieved by an energy-absorbing deformation member that is secured to a dimensionally stable carrier which is positioned below the dashboard and which is, in turn, suitably connected to the vehicle. The energy-absorbing deformation member is constructed in such a manner that its deformation forces are largely independent of the direction of impact.

In its broadest aspect, the present invention provides an energy-absorbing deformation member which is affixed to a dimensionally stable carrier that extends below the dashboard and which is removably connected to the vehicle.

In a preferred embodiment of the present invention, the deformation member is constructed as a hollow body, in particular in the form of a hollow body having an elongated, ring-shaped cross section. In another particularly advantageous embodiment of the impact-element design according to the present invention, the energy-absorbing deformation member is defined by an element that is constructed in the form of a box-shaped, elongated hollow body. In the second embodiment of this invention, a dimensionally stable, diagonally oriented elongated cross piece is positioned on the inside of the hollow body.

Accordingly, it is an object of the present invention to provide an improved impact-element for the protection of the occupants of a vehicle.

It is another object of the present invention to provide an improved impact-element, particularly for the protection of the knees of the occupants of a motor vehicle.

A further object of the present invention is to provide an improved impact-element for the protection of the occupants of a vehicle, as described above, wherein an elongated, energy-absorbing deformation member is secured to a dimensionally stable, elongated carrier that is mounted under dashboard of the vehicle.

An additional object of the present invention is to provide an improved impact-element, as described above, wherein at least the portion of the energy-absorbing deformation member that is in opposition to the knees of the occupants of the vehicle is arcuate in transverse cross section.

A particular object of the present invention is to provide an improved impact-element, as described above, wherein the energy-absorbing deformation member is ring-shaped in transverse cross section.

Another object of the present invention is to provide an impact-element for the protection of the occupants of a motor vehicle, as described above, wherein the energy-absorbing deformation member is box-like in transverse cross section.

A feature of the present invention is that the box-shaped energy-absorbing deformation member, as described above, may be mounted below the dashboard of the motor vehicle in opposition to the knees of the occupant, so as to provide an additional repository area between the energy-absorbing member and the dashboard.

An advantage of the present invention is that there is provided an improved impact-element for the protection of the occupants of a motor vehicle, the impact-element being adapted to be mounted either during the original manufacture of the motor vehicle or at any time thereafter.

Another advantage of the present invention is that the improved impact-element, as described above, is removably secured to the dashboard of the motor vehicle.

These and other objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the various figures of the drawing, like reference characters designate like parts. In the drawing.

DESCRIPTION OF THE PREFERRED EMBODIMENTS

Figure 1:
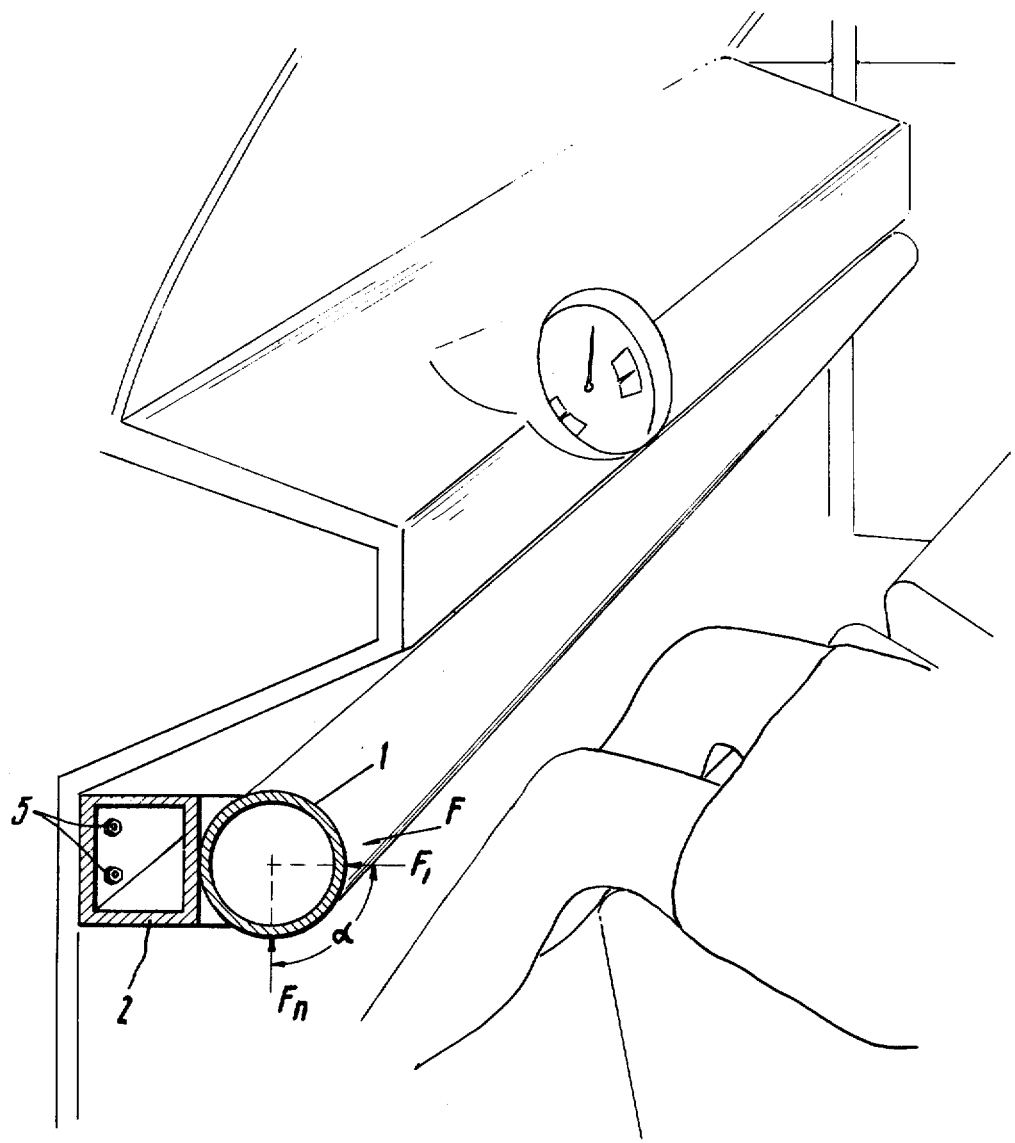
FIG. 1 is a transverse, sectional elevational view illustrating one embodiment of the impact-element comprising the present invention.

Turning now to the drawings, it will be seen in FIG. 1 that the impact-element of the present invention comprises two different constructional elements. The first element is a dimensionally stable elongated carrier 2 that is in the form of a hollow body having a rectangular cross section which may, for example, be connected to the front door post of an automotive vehicle (not shown). An elongated, energy-absorbing deformation member, in the form of a deformable sheet metal element 1 is suitably secured to the dimensionally stable carrier 2.

In the first embodiment of the invention, the deformable sheet metal element 1 is constructed in the form of an elongated, hollow body having a ring-shaped transverse cross section. In this manner, it is assured that the deformation force of the energy-absorbing deformation member 1 is the same at varying directions of application of force F, that is to say at any number of different impact directions ranging from $F_1$ to $F_n$. Since the impact-element is intended, preferably, for the protection of the knees of the occupants of the vehicle, it is desirable that the sheet metal energy-absorbing deformation member 1, which is constructed in the form of an elongated hollow body, has a transverse cross section which is in a ring-shaped form, at least in the region thereof that is in opposition to the knees of the occupants of the vehicle. In this case, a region of approximately 90° should be sufficient and is designated by the reference character $\alpha$ in FIG. 1. The deformation force of the energy-absorbing deformation member 1 must be of such an order of magnitude that the striking impact or impact velocity of the vehicle's occupant is relatively slowly decelerated by the yielding and permanent deformation of the energy-absorbing member 1 without the load of the impinging body becoming too large. The magnitude of the deformation force of the energy-absorbing deformation member 1 is determined, in part, by dimensional criteria, especially by the thickness of the sheet metal used therein and, in part, by the diameter of the circular hollow body, as well as by the type of the material chosen.

Figure 2:
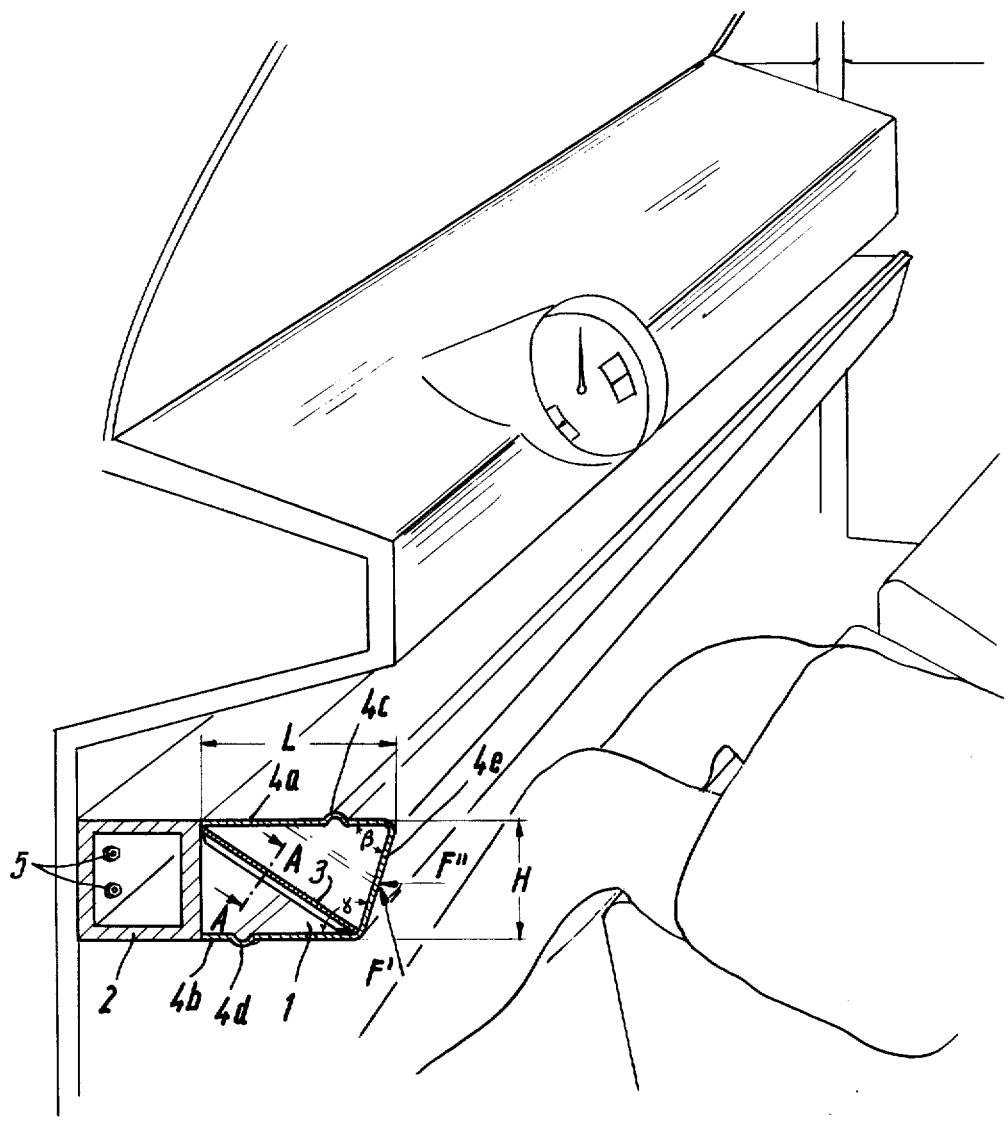
FIG. 2 is another transverse, sectional elevational view illustrating an alternative embodiment of the impact-element comprising the present invention.
Figure 3:
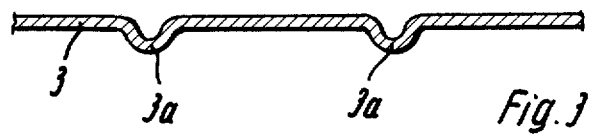
FIG. 3 is a fragmentary sectional elevational view taken along line A—A of FIG. 2.

In FIG. 2, an alternative embodiment of the impact-element comprising the present invention is illustrated. The alternative embodiment of this invention has an elongated box-shaped hollow body. As in FIG. 1, the impact-element of the second embodiment comprises two different constructional elements, namely the dimensionally elongated stable carrier 2 that is suitably connected to a portion of the vehicle and an elongated deformable sheet metal element 4 which is constructed in the form of an energy-absorbing member. The deformable, energy-absorbing sheet metal member 4 is constructed in the form of a box-shaped hollow body having an elongated dimensionally stable, diagonal cross piece 3 arranged on the inside thereof. The cross piece 3 touches or acts upon the upper end of the dimensionally stable carrier 2. The cross piece 3 is provided with a plurality of laterally spaced apart, transversely extending stiffening corrugations 3a which impart the desired stability. The stiffening corrugations 3a can best be seen in FIGS. 2 and 3. The surfaces 4a and 4b of the deformable, energy-absorbing box-shaped hollow member 4 which come in contact with or act upon the dimensionally stable carrier 2 are each provided with a least one stiffening corrugation 4c and 4d, respectively, that extend in a longitudinal direction.

Despite the fact that there is a relationship of depth L to height H, which by itself is inherently unfavorable, the impact-element shown in FIG. 2, through its special form of construction, provides a substantially constant deformation force for the region of the direction of application of the forces F' and F" which are typically indicated by way of example, in FIG. 2. The energy-absorbing deformation member 4 is provided with a forwardly directed surface 4e that is in opposition to the dimensionally stable carrier 2. The surface 4e is positioned at an angle that is of a theoretically vertical plane. That is, the surface 4e forms an acute B angle with respect to the surface 4a and also forms an obtuse angle a with respect to the surface 4b, which is spacedly opposed to the surface 4a.

The impact-element shown in FIG. 2 has an additional advantage in that it can not be used for the protection of the occupants of the motor vehicle, but can also be made use of as an additional repository area. For this purpose, the embodiment of the invention shown in FIG. 2 is not installed directly below the dashboard of the motor vehicle but instead is spaced a certain distance below the dashboard. As may readily be appreciated, the impact-element designed according to the present invention can also be installed in the motor vehicle at a later point in time after manufacture, since the dimensionally stable carrier can be removably connected to an interior portion of the vehicle, especially to the front door post of the vehicle, as illustrated by bolt means 5 in FIGS. 1 and 2.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A safety device for protecting an occupant of a vehicle, particularly a motor vehicle, against injury in the event of rapid deceleration of the vehicle relative to the occupant, comprising
    a rigid carrier;
    means for mounting said carrier in the passenger compartment of a vehicle forwardly of the position assumed by an occupant; and
    a plastically deformable energy-absorbing member provided on said carrier and positioned to undergo plastic deformation upon impacting by the occupant to thereby absorb the impact energy and protect the occupant, said member being constructed in the form of a hollow body which is box-shaped in cross section and wherein there is further provided a deformation resistant, diagonally oriented cross piece in said hollow body.

2. The device according to claim 1 wherein said diagonal cross piece contact an upper end of said carrier.

3. The device according to claim 1 wherein said diagonal cross piece includes stiffening corrugations extending in a transverse direction.

4. The device according to claim 1 wherein two surfaces of said box-shaped hollow energy-absorbing member each include at least one stiffening corrugation extending in a longitudinal direction.

5. The device according to claim 1 wherein said energy-absorbing deformation member is made of sheet metal.

6. The device according to claim 1 wherein said carrier is adapted to be removably connected to the vehicle.

7. The device according to claim 5, wherein said carrier is adapted to be removably secured to the front door post of the vehicle.

8. The device according to claim 1 wherein said energy-absorbing deformation member is of polygonal cross section.

9. The device according to claim 8, wherein said energy-absorbing deformation member includes an angularly oriented end face that is in opposition to said carrier.

10. The device according to claim 9, wherein said angularly oriented end face forms an acute angle with respect to one surface of said energy-absorbing deformation member and forms an obtuse angle with respect to an opposed other surface of said energy-absorbing deformation member.

11. The device according to claim 1, wherein said energy-absorbing member is adapted to be positioned below and in spaced relationship with the dashboard of the motor vehicle.

* * * * *